3,753,976
PROCESS FOR PREPARING POLYHALOHEMI-
ACETAL DERIVATIVES OF POLYSACCHARIDES
George M. Grass, Jr., Phoenixville, and Raymond R.
 Unangst, Havertown, Pa., assignors to Smith Kline &
 French Laboratories, Philadelphia, Pa.
No Drawing. Filed July 17, 1972, Ser. No. 272,261
Int. Cl. C08f 19/06
U.S. Cl. 260—233.3 A                    8 Claims

ABSTRACT OF THE DISCLOSURE

Polyhalohemiacetal derivatives of polysaccharides are prepared by dissolving the reactant, a polyhaloacetaldehyde, its hydrate or alkanoate with a polysaccharide in the desired weight ratio in a minimum amount of water; after a brief reaction period the reaction mixture is diluted with water to give an easily handled viscosity then spray dried. The process is most useful to prepare amicloral using chloral or chloral hydrate and a commercial grade of starch such as U.S.P. or pearl grade.

---

This invention concerns a new method of preparing polyhalohemiacetal polysaccharides. Briefly this invention comprises dispersing the appropriate polyhaloacetaldehyde, its hydrate or lower alkanoate and the polysaccharide in water. After a brief reaction period at ambient temperature the slurry is spray dried to give a stable, pharmaceutically elegant hemiacetal product The end products of this invention are known to be useful to increase the feed efficiency of ruminant animals by inhibiting methanogenesis in the rumen thereby allowing the animal to convert energy normally lost in the rumen by the formation of methane gas to be converted into fatty acids such as propionic or butyric acids which can in turn be more readily converted into meat producing tissue. The lead compound in this polyhalohemiacetal group of compounds is amicloral which is the product of chloral, its hydrate or lower alkanolate, with a commercial grade of starch such as U.S.P. or pearl starch. Other polyhalohemiacetal polysaccharides, their use and prior art methods of preparation may be found in U.S. Pat. No. 3,615,649. The term amicloral is used herein generically except in the examples to include the compounds of this patent.

The methods of preparation used previously to prepare amicloral were of a strictly chemical nature. By this we mean chloral, or one of its equivalents, is reacted, most often in an organic solvent such as benzene, with a polysaccharide such as starch usually with heating for a number of hours over a water trapping device. The product is then isolated by normal chemical isolation procedures. Quite often the resulting product is a lumpy chemical which must be ground or comminuted to give a product which can be uniformly mixed with ruminant feed. Also to prepare end products which have a high halo (chlorine) or acetal content extended heating is necessary often resulting in low overall yields.

The process of this invention unexpectedly supersedes the relatively laborious chemical preparation of amicloral thereby reducing the chemical cost of the product several fold. This is a most important advantage since increasing the feed efficiency to the ruminant animal grower depends critically on the cost of the feed additive to the meat producing grower. The lower the cost of the additive, the more savings to the grower.

The present invention has a number of significant advantages. First the use of organic solvents with recovery costs thereof and the use of expensive synthetic equipment is eliminated. The overall production time is significantly reduced. The end product is a free flowing fine powder easily used as such. Other pharmaceutical ingredients to control the availability of the active ingredient or to improve the field stability of the active ingredient may be easily added to the reaction without an additional step such as carboxymethyl cellulose, lecithin, pectins, magnesium stearate, methylcellulose, mono, di or tri-glyceryl stearates, polyvinylpyrrolidone, silicates, pharmaceutical oils and waxes etc.

Even more important is the ease of preparing polyhalohemiacetal polysaccharides of high haloacetal content. For example, the process of this invention easily prepares stable preparations of amicloral of about 30 up to about 40% chlorine content compared to the normal product which has a chlorine content of 18–22%. This enables the manufacturer to produce a stable, more potent product with less bulk. However the claimed process is presently most advantageous as noted above for producing a product favorably comparable to the prior art commercial grade of amicloral.

The first step in the process of this invention comprises dispersing the polysaccharide ingredient and the polyhaloacetaldehyde in a minimum amount of water. The amount of water should be sufficient for effective dispersal of the reactants which of course must be at least partially water soluble. The ratio of the weight of the two reactants to the solvent, water, can run from about 2:1 to 1:2 of both reactants to water. For example, for 100 parts by weight of the two reactants from about 50–200 parts preferably about 75–125 parts of water can be used. The slurry is then allowed to react for a short time such as up to 15–30 minutes or as little as 2–5 minutes dependent on the volume of water used in the reaction mixture. The reaction is usually at ambient temperature since heating is of no particular advantage. If necessary, as usually may be, the slurry is then diluted with water to yield a mixture of the consistency necessary for handling prior and during the final spray drying step. The mixture is then spray dried at an inlet temperature of from about 125–275° C. preferably about 225–250° C. and an outlet temperature of from about 60–140° C. preferably about 110–120° C. Any desired pharmaceutical additives such as those mentioned above can be added either before or after the dilution step as the physical and chemical nature of the additive dictates. For example water soluble additives such as methylcellulose polyvinyl pyrrolidone can be added already dissolved in the dilution water; insoluble additives such as oils and waxes prior to dilution. Although not strictly necessary, best results are realized by agitation during the reaction and dilution processes.

The proportion of chloral to starch (polyhaloacetaldehyde to polysaccharide) can be varied over a wide range depending on the desired chloral or chlorine content of the product. Usually the reactants are from about 1 to 1 to 3 to 1. At the higher ranges of chlorine content often a slight excess of the theoretical amount of the chloral ingredient may be used to advantage.

The spray drying step may be carried out in any convenient equipment from a Niro laboratory model 53 to a semiworks dried manufactured by Bowen Engineering to the full scale commercial column spray driers. The rate of feed is only dependent on the equipment but for the Niro laboratory driers about 50 ml./min. of feed rate is used.

The following are designated to teach how to practice this invention using specific examples.

EXAMPLE 1

A dispersion of 71 g. of starch (pearl, U.S.P., or potato) in 100 ml. of water is mixed with 29 g. of anhydrous chloral. The mixture is stirred until it thickens (about 2 minutes) then 100 ml. of water is added. The resulting mixture is then spray dried in a Niro laboratory model spray drier at a feed rate of 50 ml./min. with an inlet temperature of 225° C. and an outlet temperature of 110° C. The resulting powder is amicloral (100 g., 20% Cl).

EXAMPLE 2

A mixture of 71 g. of corn meal and 32 g. of chloral hydrate in 100 ml. of water is allowed to react with stirring for 15 minutes. The mixture is diluted with 100 ml. of water and the resulting slurry is spray dried at 250° C. inlet temperature and 120° C. outlet temperature to give a powder having 17.5% chlorine.

EXAMPLE 3

A mixture of 5 g. of glyceryl tristearate and 0.5 g. of sorbitan monooleate in 50 ml. of water is agitated and warmed then added to a mixture of 65.5 g. of starch U.S.P., chloral 29 g. and 100 ml. of water. After a few minutes under stirring the mixture is diluted with 250 ml. of water then spray dried as described in Example 1 to give amicloral powder partially coated with glyceryl tristearate with an assay of 20.6% chlorine.

EXAMPLE 4

A mixture of 63 g. of starch and 32 g. of chloral hydrate in 100 ml. of water is stirred to react then diluted with 70 ml. of water. Five grams of corn oil is added followed by 175 ml. of water for dilution. The resulting mixture is then spray dried as in Example 1 to give amicloral powder partially coated with oil with an assay of 19% chlorine or 29.6% chloral hydrate.

EXAMPLE 5

A mixture of 50 g. of starch and 50 g. of chloral hydrate in 100 ml. of water is allowed to react for 10 minutes. The mixture is diluted with 190 ml. of water then spray dried as in Example 1 to give a starch chloral hemiacetal with an assay of 30.2% chlorine or 47.1% chloral hydrate.

EXAMPLE 6

A mixture of 40 g. of starch and 60 g. of chloral hydrate in 100 ml. of water containing 10 ml. of conc. hydrochloric acid is allowed to react then diluted with 285 ml. of water. After spray drying as in Example 1 a hemiacetal compound is recovered with 54.6% chloral hydrate or 34% chlorine.

EXAMPLE 7

Substituting equimolar quantities of bromal, 2,2,3-trichlorobutyraldehyde, dichloracetaldehyde, dibromoacetaldehyde or their equivalent hydrates or lower alkanolates for chloral in Example 1 give the corresponding bromal, 2,2,3 - trichlorobutyral, dichloroacetal, dibromoacetal starch hemiacetal products.

Other polysaccharides which may be substituted are any that are soluble or dispersible enough in water to disperse and swell then react with the polyhaloacetaldehyde reagent such as those described in U.S. Pat. No. 3,615,649, column 2, lines 38–64. Briefly the polysaccharides preferably used are at least partially water soluble polyglucans of having from 10–5000 sugar units. The most useful polysaccharides are the starches having from 100–2000 sugar units.

As an alternative to the spray drying process described above a flash drying process may be employed as will be evident to one skilled in the art. The two processes are based on the same principle, namely, introducing an aqueous slurry or aqueous moistened solid into a warm stream of air or gas, however flash drying involves the use of a wet solid rather than a slurry or solution of the reaction product. The process would therefore comprise reacting the polysaccharide and polyhaloacetaldehyde reactants as described above. The swollen reaction mixture would then be fed into a flash drying apparatus which cycles dry hemiacetal product back into the wet mixture being fed to maintain a wet but readily mobilized hemiacetal solid product. The dry feedback would, for example, comprise about 15–25% of the incoming stream. The resulting product is comparable to the spray dried product described above.

We claim:

1. The method of preparing a polyhalohemiacetal polysaccharide comprising reacting a polyhaloacetaldehyde with a polysaccharide, said reactants being effectively dispersed in a minimum amount of water then spray drying the reaction mixture using an inlet temperature of from about 125–275° C. and an outlet temperature of from about 60–140° C.

2. The method of claim 1 in which the polyhaloacetaldehyde is chloral.

3. The method of claim 2 in which the polysaccharide is starch.

4. The method of claim 3 in which the weight ratio of reactants to water is from about 2:1 to 1:2.

5. The method of claim 4 in which the spray drying is carried out with an inlet temperature of from about 225–250° C. and an outlet temperature of from about 110–120° C.

6. The method of claim 3 in which the reaction of chloral and starch in water is allowed to proceed at ambient temperature to completion, water is added to form a diluted mixture sufficiently fluid to spray dry and the diluted mixture is spray dried.

7. The method of claim 6 in which the weight ratio of the reactants to water in the reaction step is from about 2:1 to 1:2.

8. The method of claim 1 in which the weight ratio of the reactants to water is from about 2:1 to 1:2.

References Cited

UNITED STATES PATENTS 3,615,649  10/1971  Parish et al. _____ 260—233.3 A

DONALD E. CZAJA, Primary Examiner

M. I. MARQUIS, Assistant Examiner

U.S. Cl. X.R.

99—2 R; 424—180; 260—209 D, 209 R, 231 A, 232, 233.3 R, 33.5